United States Patent
Kazem et al.

(10) Patent No.: US 6,738,621 B1
(45) Date of Patent: May 18, 2004

(54) EXCHANGE OF COMMUNICATION TRAFFIC IN A SATELLITE COMMUNICATION SYSTEM

(75) Inventors: Mohammed Ismael Kazem, The Hague (NL); Willem Stado Mulder, Zoetermeer (NL); Tiemen Lukas Brill, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 09/555,684

(22) PCT Filed: Nov. 6, 1998

(86) PCT No.: PCT/EP98/07212
§ 371 (c)(1),
(2), (4) Date: Jul. 18, 2000

(87) PCT Pub. No.: WO99/30436
PCT Pub. Date: Jun. 17, 1999

Related U.S. Application Data

(60) Provisional application No. 60/067,668, filed on Dec. 5, 1997.

(30) Foreign Application Priority Data

Dec. 5, 1997 (NL) .............................................. 1007717

(51) Int. Cl.[7] .......................... H04Q 7/20; H04B 7/185
(52) U.S. Cl. ...................... 455/427; 455/12.1; 455/428; 455/406; 455/445
(58) Field of Search ................ 455/12.1, 13.1, 455/13.3, 427, 406, 433, 432.3, 430, 428, 445

(56) References Cited

U.S. PATENT DOCUMENTS

| | | | | |
|---|---|---|---|---|
| 5,333,185 A | * | 7/1994 | Burke et al. ............ | 379/127.01 |
| 5,946,618 A | * | 8/1999 | Agre et al. ................ | 455/428 |
| 6,201,967 B1 | * | 3/2001 | Goerke .................... | 455/435.1 |
| 6,208,836 B1 | * | 3/2001 | Albuquerque Moraes et al. ............ | 455/13.1 |
| 6,324,405 B1 | * | 11/2001 | Young et al. ............ | 455/456.1 |
| 6,373,946 B1 | * | 4/2002 | Johnston ................... | 380/211 |

* cited by examiner

*Primary Examiner*—Nay Maung
*Assistant Examiner*—Edan Orgad
(74) *Attorney, Agent, or Firm*—Frishauf, Holtz, Goodman & Chick, P.C.

(57) ABSTRACT

For exchanging telecommunications traffic with land mobile telecommunication networks, it is proposed to make use of a satellite communication network, made up of a number of telecommunication satellites in different orbits around the earth, which are functionally connected to one or more ground stations via radio transmission connections, which ground stations are mutually connected via a transmission connection. By assigning a unique network address code added to the address code of the satellite communication network concerned to the mobile telecommunication networks connected to a ground station, telecommunication traffic with a mobile telecommunication network can be exchanged via the mutually connected ground stations by means of a combination of the address code of the satellite communication network and the network address code of the mobile telecommunication network concerned. In this way, an effective solution for the problem of 'Mobile Terminating Charges' is provided. Besides, by application of the network address code, the 'tromboning' phenomenon on guest use of mobile telecommunication networks can be effectively prevented.

24 Claims, 5 Drawing Sheets

EXCHANGE OF COMMUNICATION TRAFFIC IN A SATELLITE COMMUNICATION SYSTEM

REFERENCE TO PRIOR APPLICATION

The present application claims the benefit under 35 USC 119(e) of U.S. Provisional Application No. 60/067,668 filed in the United States on Dec. 5, 1997, and also claims the benefit of International Application No. PCT/EP98/07212 filed Nov. 6, 1998, claiming the benefit of said U.S. Provisional Application.

FIELD OF THE INVENTION

The present invention relates to exchanging telecommunication traffic in a telecommunication system, comprising a satellite communication network, made up from a number of telecommunication satellites in different orbits around the earth, which are functionally connected to one or more ground stations via radio transmission connections, which ground stations are mutually connected via a transmission connection, as well as a ground communication network made up from a number of fixed and mobile telecommunication networks, in which clusters of fixed and mobile telecommunication networks are functionally connected to ground stations of the satellite communication network and telecommunication traffic is exchanged under application of an addressing plan, in which an own, unique address code is assigned to the satellite communication network.

BACKGROUND OF THE INVENTION

Next to, and in addition to the known, fixed telecommunication networks, in which users can set up speech and data communication via a fixed, wire-bound connection, mobile communication via radio connections has assumed enormous proportions in recent years. Apart from differences in the applied transmission techniques, land-mobile communication is characterised by a structure, in which the coverage area of a mobile radio telecommunication network is divided into areas of geographically limited size, also called cells. Within a cell, radio traffic is possible between so-called base station and radio communication users.

On displacement of the user, a communication connection from cell to cell is continued. The geographical position of a user, i.e. the cell in which he is momentary present, is scanned regularly and stored in the system. An example of such a cellular mobile radio communication system is the 'Global System for Mobile Communications (GSM)'. Systems based upon this standard are currently designated as GSM-900, GSM-1800 and GSM-1900. Other mobile telecommunication systems based on a cell structure are among other designated by the acronyms AMPS, D-AMPS in the United States and PDC in Japan. In a certain area, different mobile networks can be exploited by different operators. In general, the exploitation of mobile telecommunication networks is limited to the national boundaries. In order to enable international mobile telecommunication traffic agreements have been made between the different national operators concerning the access of subscribers to each other's mobile telecommunication networks. The fixed telecommunication networks and the mobile telecommunication networks are connected as well, in order to enable telecommunication traffic between 'fixed' and 'mobile' users. In general, telecommunication traffic between countries is exchanged via so-called 'International Carriers' and on a global level via so-called 'Global Carriers'. These are telecommunication companies that provide transmission facilities for the exchange of telecommunication traffic at international or global level, respectively.

A further communication possibility for mobile users is formed by satellite communication networks, made up from a number of telecommunication satellites in different orbits around the earth, which are functionally connected to one or more ground stations via radio transmission connections. The ground stations are dispersed over the earth in such a way, that a global coverage is achieved.

Depending on the network, the ground stations can be mutually connected via a transmission connection, e.g. in the form of a ring network. The ground stations are, in their turn, again connected to clusters of fixed and land mobile telecommunication networks, if desired, by intervention of global and international carriers.

A user provided with suitable satellite radio communication equipment, can through a direct radio connection with a telecommunication satellite and a ground station concerned, be connected to a user in a fixed or land mobile telecommunication network and of course with other users of the satellite communication network.

Satellite communication networks, which have been proposed in practice, but which are still under development, are, among others, Globalstar and Iridium, in which use is made of a relatively large number of ground stations and satellites, which circle in a low orbit around the earth, i.e. 'Low Earth Orbit (LEO)'. ICO and Odyssey are satellite communication networks, in which use is made of a relatively small number of satellites, which rotate in orbits of medium altitude around the earth, also called 'Medium Earth Orbit (MEO)' satellite communication networks.

In order to be able to use the existing charging structures, it has been proposed to settle telecommunication traffic originating from and to a satellite communication network in a similar way as the land mobile telecommunication networks by intervention of global and international carriers.

As will be understood by experts, the costs of mobile telecommunication are higher than the for telecommunication traffic through the fixed telecommunication network, that has been in use for a long time. This is expressed in the higher connection charges per unit of time for mobile telecommunication traffic in comparison to fixed connections. In communication between mobile users in the same network or mutually directly connected mobile telecommunication networks and in calls of mobile users to the fixed telecommunication network, these higher call charges can be directly settled with the mobile users. To this end, the mobile telecommunication networks have been provided with suitable charging options. At the national level, the higher call charges of use of the mobile telecommunication network can also be charged to a fixed user, who requests a call to a mobile user. This is because calls from the fixed network to a mobile user take place through one or more dedicated access exchanges.

On international and global level, calls of a fixed user to a mobile user and between mobile users of non connected mobile telecommunication networks are charged on the basis of connections between two users in different countries of the fixed telecommunication network. This can be explained from the fact that for international and global connections with mobile users use is made of the same transmission routes, via international and global carriers, as for the exchange of telecommunication traffic between users connected to fixed telecommunication networks. The costs for the use of the mobile part of the connection in the mobile telecommunication network of the called mobile user are then for account of the operator of the mobile telecommunication network concerned. Depending on the tariff structure, this can with the present tariffs, quickly lead to losses in the order of USD 0,50 per minute.

Another problem arises when a mobile subscriber cannot be reached in his home network, but temporarily makes guest use of a mobile telecommunication network elsewhere, e.g. in another country.

On making a connection from a fixed to a mobile user namely, first a connection is made with the home network of the mobile user and the call is, depending on the momentary position of the mobile user, switched through to the telecommunication network where the user is located at that particular time. When the mobile subscriber concerned unexpectedly does not answer the switched-through call, switching back can take place from the mobile guest network to the mobile home network. This is done for instance to make use of a message service etc., for leaving a spoken or written message for the mobile user concerned. It will be apparent that this switching through and back, also called 'tromboning', is highly undesired due to the unnecessary use of costly transmission facilities in the telecommunication systems concerned.

The invention is aimed at providing a solution for the disadvantages and shortcomings described above which occur on exchanging telecommunication traffic between fixed and mobile telecommunication networks on both international and global level. In a first aspect, the invention provides a process for exchanging telecommunication traffic in a telecommunication system mentioned in the preamble, characterised in that a unique network address code added to the address code of the satellite communication network concerned is assigned to the mobile telecommunication systems, which are functionally connected to a ground station, in such a way that telecommunication traffic with a mobile telecommunication network is exchanged via a combination of the address code of the satellite communication network and the network address code of the mobile telecommunication network concerned via the mutually connected ground stations. The invention uses advantageously the fact that, when the ground stations of a satellite communication network are mutually connected, e.g. in the form of a ring wire, thus an alternative transmission route can be made available for the exchange of telecommunication traffic between fixed and land mobile telecommunication networks. This next to and in addition to the transmission capacity provided by international and/or global carriers, which is currently still the regular route.

By adding, according to the invention, network address codes for the mobile telecommunication networks to the unique address code of a satellite communication network, these can be directly selected via the transmission route along the ground stations of the satellite communication network, whereby direct international and global exchange of telecommunication traffic with national mobile telecommunication networks is made possible.

In departure from the existing regular route for internationally and globally exchanging telecommunication traffic between fixed and mobile networks, in which existing routing tables in the international switching centres do not allow differentiation between fixed and mobile telecommunication networks, can in this embodiment of the process according to the invention a mobile telecommunication network be addressed in a unique way. That is to say, by routing the telecommunication traffic concerned via the ground stations of the satellite communication network.

Owing to the mobile telecommunication networks being directly addressable according to the addressing or number plan of the invention, it is now possible in international and global connections of fixed users to mobile users to settle the costs of the mobile transmission part with the calling fixed user. This is also being referred to as 'Mobile Terminating Charges (MTC).'

For experts it will be apparent that the addressing plan according to the invention enables very flexible operation. Operators of ground stations and/or mobile networks have with this in a very flexible way transmission capacity for the exchange of international telecommunication traffic between fixed and mobile users at their disposal, without the disadvantages of mobile transmission costs that cannot be settled.

In a further embodiment of the process according to the invention, in which the clusters of fixed and mobile communication networks are functionally connected to the ground stations of the satellite communication network via so-called transmission gateways, which transmission gateways are mutually connected via a transmission connection, it is provided that telecommunication traffic between clusters of fixed and mobile telecommunication networks is exchanged partly via the mutually connected ground stations and partly via mutually connected transmission gateways.

With this embodiment of the process according to the invention, it is possible to have the telecommunication traffic to be exchanged in the ground communication network handled partly by the regular route (international carrier/ global carrier) and partly via the alternative route between the connected ground stations. With this, a very flexible routing of telecommunication traffic is obtained, also in those cases in which ground communication networks are not directly connected to a ground station of the satellite communication network. In the currently presented concept of Odyssey for instance, seven mutually connected ground stations are provided, so that clusters of fixed and land mobile telecommunication networks, via e.g. an international carrier, will be connected to the ground station in an other country.

The addressing plan according to the invention offers furthermore an effective possibility of solving the problem of tromboning. An even further embodiment of the invention provides to this end in exchanging telecommunication traffic with a user, who makes guest use of a mobile telecommunication network, by establishing a communication connection under application of the network address code concerned of the mobile telecommunication network of which the user makes guest use.

Herewith, advantageous use is made of the fact that the momentary position of a mobile user is continuously scanned and stored. By providing this information in the domain of the satellite communication network, a connection of a fixed to a mobile user can be established directly via the network address code concerned of the mobile telecommunication network where the user is located. Without first switching to the home network and thereupon switching through to the guest network. It will be appreciated that the scarce mobile transmission facilities are thus used in an efficient way.

In an even further embodiment of the process according to the invention, in which the telecommunication satellites are set up for exchanging telecommunication traffic via radio transmission connections with users, who are provided with mobile satellite radio communication equipment, mobile telecommunication traffic between mobile telecommunication networks and the satellite communication network is exchanged by establishing a communication connection under application of the network address code, which is assigned to a mobile telecommunication network concerned.

In other words, in a satellite communication network in which users can establish direct radio connections with a communication satellite, such as e.g. in the Odyssey concept, the addressing plan according to the invention is advantageously used for directly exchanging telecommunication traffic between mobile satellite communication users and land mobile users. Charging can be done according to the costs of the transmission facilities and other desired compensations.

In a second aspect the invention also provides a telecommunication system, comprising a satellite communication network, made up from a number of telecommunication satellites in different orbits around the earth, which are functionally connected to one or more ground stations via radio transmission connections, which ground stations are mutually connected via a transmission connection, as well as a ground communication network made up from a number of fixed and mobile telecommunication networks, in which clusters of fixed and mobile telecommunication networks are functionally connected to ground stations of the satellite communication network and in which the ground stations are provided with routing means for exchanging of telecommunication traffic according to an addressing plan, comprising a unique address code for selecting the satellite communication network, characterised in that the routing means are provided with selection means for exchanging telecommunication traffic with a mobile telecommunication network, under application of a unique network address code added to the address code of the satellite communication network for selecting a mobile telecommunication network concerned.

By suitable selection, mobile telecommunication traffic can be routed according to the invention via the satellite communication network, in association with a suitable charging. For charging purposes, the existing charging devices of an existing network can be applied, by means of suitable controlling according to the addressing plan according to the invention.

In the case of a telecommunication system in which the clusters of fixed and mobile communication networks are functionally connected to the ground stations via so-called transmission gateways, which transmission gateways are mutually connected via a transmission connection, in an exemplary embodiment according to the invention, routing means are provided for exchanging telecommunication traffic between clusters of mobile and fixed communication networks, partly via mutually connected transmission gateways and partly via the mutually connected ground stations.

Routing, routing means and selection means for routing telecommunication traffic are known per se to experts and do not need further clarification. For optimised routing of telecommunication traffic to users in guest networks, advantageous use is made, according to an even further embodiment of the invention, of existing signalling systems in both the satellite communication network and the ground communication network. These signalling systems are preferably based on the same standard, e.g. fully compatible with the CCITT signalling system and fitted for assessing the momentary mobile telecommunication network with which telecommunication traffic with a user concerned is to be exchanged, under application of the network address code of the mobile telecommunication network concerned.

In the most advanced embodiment of the telecommunication system according to the invention, direct mobile radio communication between satellite communication users and land mobile users is provided as well, wherein the satellite communication network and the mobile telecommunication networks are preferably based on the same standard, e.g. the GSM standard, which was mentioned before. In the concept according to the invention, the ground stations function then as 'super mobile gateway switches', with the advantages of an optimum settlement of call charges for calls with mobile users, optimum routing and without drastic adaptations of the existing infrastructure in international switching centres, international carriers and global carriers.

It will be appreciated by experts that in the transmission connections with which the ground stations are mutually connected, one or more routing stations can be included as well. By providing these routing stations with routing means and selection means for exchanging telecommunication traffic with a connected mobile telecommunication network under application of its network address code, the same advantages can be obtained as described in the above as related to the ground stations.

In the following, the invention is described in more detail with reference to the attached

DETAILED DESCRIPTION OF THE INVENTION

The invention is illustrated in the following without detailed technical descriptions of the fixed and mobile telecommunication systems or satellite communication systems, this being deemed not necessary for a good understanding of the invention.

More detailed information regarding the mentioned systems can, among others, be found in manuals and text books about fixed, mobile and satellite communication.

Figure 1:
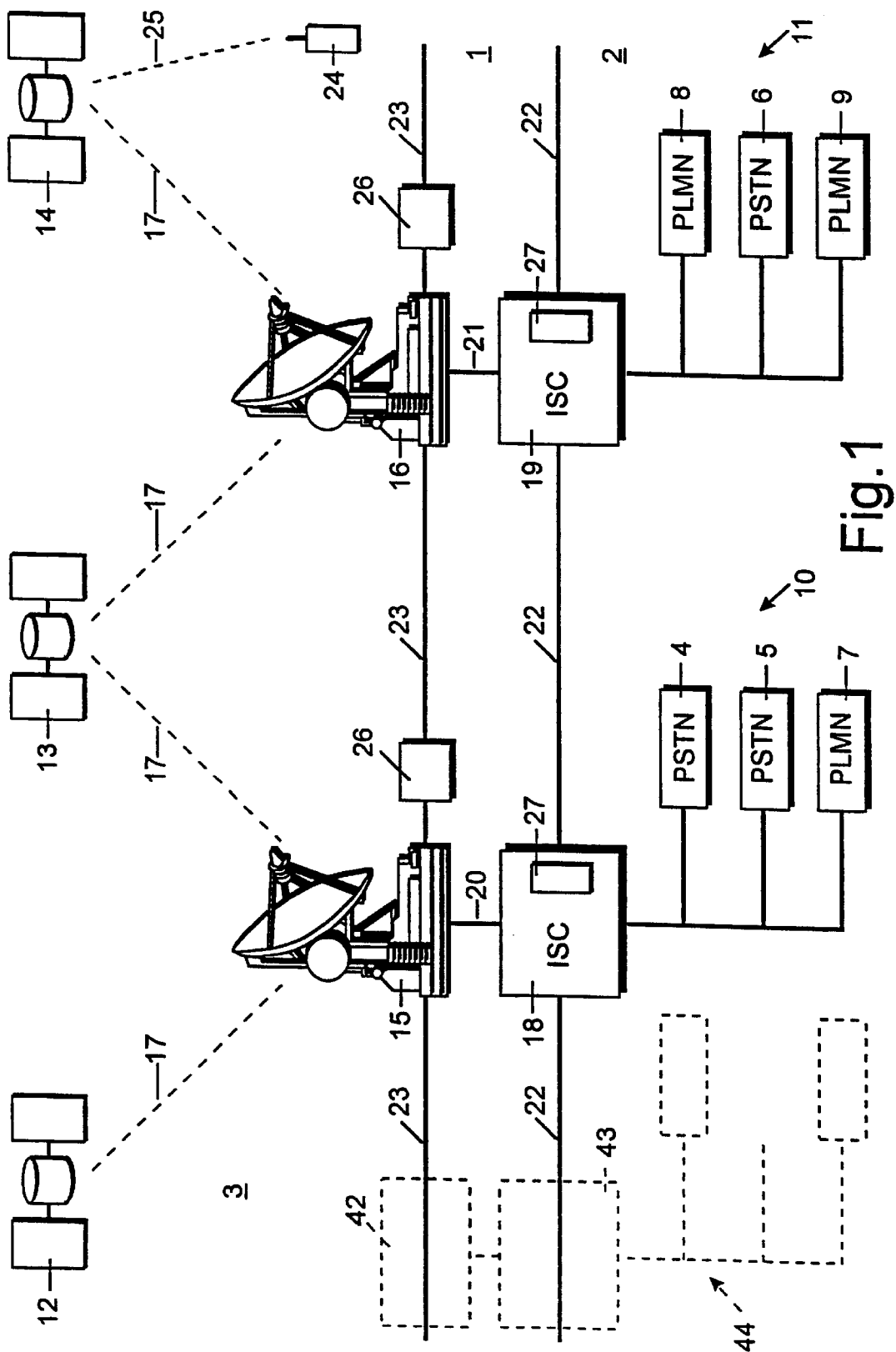
FIG. 1 shows in block diagram form a telecommunication system, comprising a mutually connected satellite communication network and ground communication network.

FIG. 1 shows in block diagram form a part of the telecommunication system 1, comprising a ground communication network 2 and a satellite communication network 3. The ground communication network 2 is made up from a number of clusters of fixed telecommunication networks 4, 5, 6, designated by the acronym PSTN ('Public Switched Telephone Network'), and land mobile telecommunication networks 7, 8, 9, designated by the acronym PLMN ('Public Land Mobile Network').

The PSTN 4, 5, 6 can be existing, fixed, national telephone and data communication networks, which are exploited by different operators. Fixed telecommunication networks are sometimes also referred to by the acronym ISDN ('Integrated Services Digital Network').

The land mobile networks 7, 8, 9 can also be exploited by different operators and be limited to a specific country or part of a country. The PLMN 7, 8, 9 can for instance work according to the cellular 'Global System for Mobile communications (GSM)', i.e. GSM-900, GSM-1800 and GSM-1900.

The PSTN 4,5 and the PLMN 7 are associated into a cluster 10, while the PSTN 6 and the PLMN 8, 9 form a cluster 11.

The satellite communication network 3 comprises a number of telecommunication satellites 12, 13, 14 and a number of ground stations 15, 16. The telecommunication satellites 12, 13, 14 circle in different orbits around the earth. The number of telecommunication satellites 12, 13, 14 and the number of ground stations is chosen in such a way that preferably a complete coverage of the entire earth is obtained. Satellite communication networks with telecommunication satellites in a relatively low orbit around the earth, the so-called 'Low Earth Orbit (LEO)', require more satellites and ground stations for a complete coverage than telecommunication satellites in a so-called 'Middle Earth Orbit'. Via radio transmission connections 17, the telecommunication satellites 12, 13, 14 are functionally connected to one or more of the ground stations 15, 16. The cluster 10 of fixed and mobile telecommunication networks is functionally connected to the ground station 15 via a so-called 'gateway' or 'International Switching Centre (ISC)' 18 via a transmission connection 20. The cluster 11 is in the same way functionally connected via a gateway 19 and a transmission connection 21 to the ground station 16. The gateways 18, 19 are via international and global transmission connections 22 mutually connected, whereas for the telecommunication system according to the invention the ground stations 15, 16 are mutually connected via a transmission connection 23, for instance in the form of a ring network.

The transmission connections 22 and 23 are suitable for exchanging telecommunication traffic and may comprise both wire-bound and wireless transmission paths, including fibre optics.

The transmission connections 22 can again be subdivided into transmission connections, which are provided by so-called 'International Carriers2 and/or 'Global Carriers'.

In practice the telecommunication traffic between the clusters 10 and 11 is exchanged via gateways 18, 19 and the transmission connection 22. A user in the PSTN 5 of cluster 10 for instance, who desires a communication connection with a mobile user in the PLMN 8 of cluster 11, will be connected via the gateways 18 and 19 and the transmission connection 22 with the PLMN 8. In the PLMN 8 a radio connection with the mobile user concerned (not shown) is then established.

When a satellite communication user 24 desires a communication connection with a user in e.g. PSTN 5, a communication connection will be established comprising a radio transmission path 25 between satellite communication user 24 and the telecommunication satellite 14, the radio transmission connection 17 between the telecommunication satellite 14 and the ground station 16, the transmission connection 21 between the ground station 16 and the gateway 19 and then via the transmission connection 22 and the gateway 18 to the PSTN 5 of cluster 10.

Telecommunication traffic between different satellite communication users 24 who have connection with different telecommunication satellites, will be handled via the own transmission connection 23 of the satellite communication network 3. For addressing of telecommunication traffic to be exchanged with the satellite communication network 3, the satellite communication network is provided with an address code, comparable to the country code for exchanging telecommunication traffic with a PSTN in a country concerned. The address code for satellite communication networks is assigned by the ITU ('International Telecommunications Union'). By dialling the address code which is assigned to the satellite communication network after the international access code (currently usually 00), a connection with the satellite communication network 3 is established.

Figure 2:
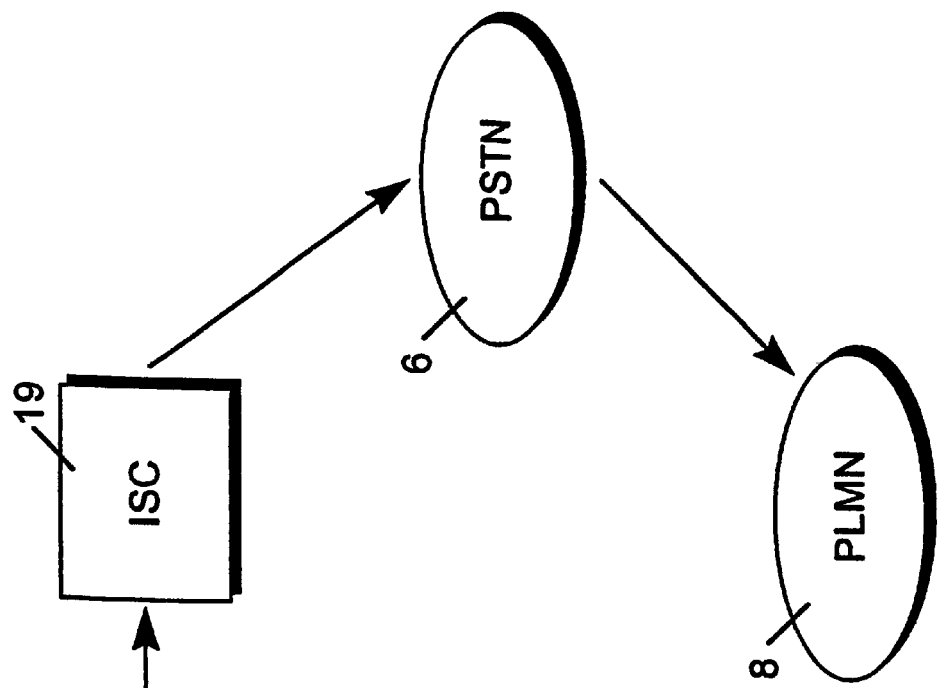
FIG. 2 shows in block diagram form the current charging via international connections of a user in the fixed telecommunication network to a user in the mobile telecommunication network.

FIG. 2 illustrates schematically the settlement of the costs for the international and/or global transmission facilities, i.e. the use of gateways or ISC, such as gateways 18, 19 and the transmission connection 22 according to the state of the art. Consider that a subscriber of the PSTN 4 in country A wants to communicate with a user in the PSTN 6 in country B. In the usual manner, contact will be made via the international access code with the gateway 18, in which by means of the routing tables included herein from the country code given by the user, a connection is made with the gateway 19 to which the PSTN 6 is connected. In the PSTN 6 contact will then finally be made with the subscriber in the usual manner via the area code and the subscriber's number. The costs for the use of the gateways 18, 19 and the transmission connection 22 will be charged to the calling subscriber in the PSTN 4 as international call charges. When the subscriber in the PSTN 4 desires a connection with a subscriber in the PLMN 8, which in this example belongs to the same cluster as the PSTN 6, in a similar way an international connection will be made via the gateways 18, 19 and the transmission connection 22. In the PLMN 8 a radio path is then established to the mobile user desired. Although the costs for establishing connections in the PLMN 8 will be higher than in the PSTN 6, there is no possibility to charge these costs to the calling subscriber in the PSTN 4. This subscriber pays the same international rate as for a connection to a fixed user in the PSTN 6. It will be appreciated that the operator of the PLMN 8 suffers a certain loss by this, because the costs of providing the radio connection in the PLMN 8 are not reimbursed.

This problem holds in the same way when a mobile user from PLMN 7 of country A via the gateways 18, 19 and the transmission connection 22 desires a connection with a mobile user in the PLMN 8 of country B.

Although it is theoretically possible to pass the costs of the use of the PLMN 8 on the called mobile user, this is considered undesirable by operators of land mobile networks, because this can weaken their competitive position. Furthermore, mobile users will take to switching off their mobile phone to prevent from being charged additionally by arriving international calls. It will be appreciated that this is contrary to the idea of continuous attainableness in mobile telecommunication and may even lead to loss of income for the land mobile operators. This is because also in the mobile telecommunication network concerned no connections with a disconnected mobile phone can be made any more, neither from the fixed telecommunication network which belongs to the same cluster or the same country as the mobile telecommunication network concerned.

In view of the rapid growth of the number of land mobile telecommunication networks direct addressing of land mobile telecommunication networks is practically impossible. The unambiguous addressing of these networks would lead to an explosion of the routing tables in the gateways 18, 19, setting aside the scarce availability of free codes.

The invention provides a solution for this problem via an addressing or number plan, in which use is made of the alternative route via the satellite communication network 3. To the land mobile telecommunication networks PLMN a network address code is assigned, which is subordinately added to the address code of the satellite communication network. Consider that the satellite communication network 3 is characterised by address code '881×', in which x is a number of 0–9, which designates a certain satellite communication network, and that according to the invention, the network codes '012' and '013', respectively, have been assigned to the PLMN 8, 9.

Figure 3:
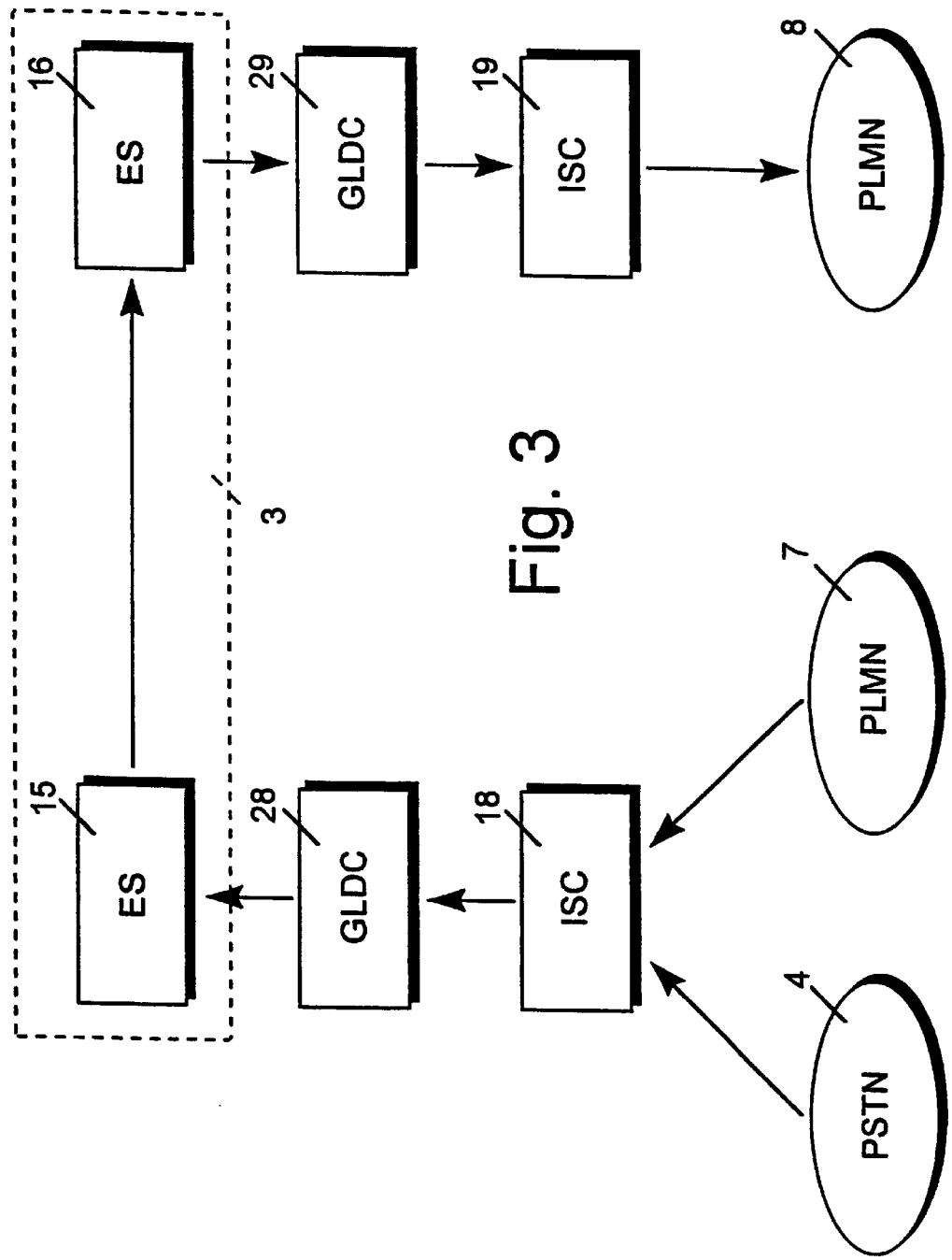
FIG. 3 shows, in sequence diagram form, the exchanging of telecommunication traffic under application of the addressing plan according to the invention.

For making a connection along international and global ways with e.g. a subscriber in the PLMN 8, where it is supposed that the satellite communication network 3 possesses the address code '8812', as address will have to be stated: '8812 012 xxxxxx', in which 'xxxxxx' is the number under which the mobile user concerned is registered in the PLMN 8 (subscriber's number). FIG. 3 shows in a sequence diagram the connection path, which is established in this way.

Consider that a user from the PSTN 4 desires a connection with a user in the PMLN 8. Via the address code '8812' it is signalled that a connection to the satellite communication network 3 has to be established via the gateway 18 of an international carrier, possibly by intervention of a global carrier 28, also sometimes designated as 'Global Long Distance Carrier (GLDC). By providing the routing means 26 of the ground station or 'Earth Station (ES)' 15 of suitable selection means, for selecting network address codes, the call path concerned is established via the gateway 19, possibly with intervention of a GLDC 29, to the PLMN 8. The gateway 19 needs to this end only to possess the routing information for the connected PLMN. By means of this limited quantity of network address codes a connection to the PLMN 8 concerned is then realised.

Unlike as described in the above, the costs for establishing the radio connection in the PLMN 8 can now be settled with the user in the PSTN 4, who asks the connection concerned. This is because by means of the network address code it can be deduced immediately that a connection is made with a mobile network, as well as the place and identity of the land mobile telecommunication network concerned. These costs can then be directly passed on to the user who requests the call, also designated as 'Mobile Terminating Charging (MTC)'. Via the usual international settlements of call charges between operators and carriers, the costs of the use of the PLMN 8 can be settled mutually.

It will be appreciated that an identical settlement structure is possible for calls from the PLMN 7 in country A to the PLMN 8 in country B.

Via the addressing or number plan of the invention, of course by means of the network address code, telecommunication traffic from the satellite communication network 3 to a land mobile telecommunication network 7, 8, 9 can be settled as well. For the purpose of the invention advantageous use can now be made as well of already existing cost exchange structures between carriers and operators of networks.

In the case of gateways that have e.g. no direct connection to a ground station of the satellite communication network, in first instance a part of the transmission connection 22, in this case the regular route, can be followed till a gateway, such as the gateways 18 or 19, which do have a direct transmission connection 20, respectively 21, with a ground station 15, 16. From such a gateway 18, 19 use can be made again, according to the invention, of the alternative route via the transmission connection 23 of the satellite communication network 3.

Also when clusters of PSTN and PLMN e.g. are connected directly to a ground station 15, 16, telecommunication traffic can be exchanged, according to the invention, both via the regular route, in this case the transmission connection 22 of the ground communication network 2, and via the alternative route via the transmission connection 23 of the satellite communication network 3.

For exchanging international and global telecommunication traffic between fixed and/or land mobile telecommunication networks, according to the invention, it will in principle be sufficient to provide routing means in the ground stations 15, 16. Schematically indicated with the reference numeral 26 as well as suitable routing means 27 in the gateways 18, 19. In practice, this will mostly boil down to suitably programming already existing routing means for exchanging telecommunication traffic via the transmission connection 23, or the transmission connection 22, and the telecommunication traffic via the transmission connections 20 and 21 between a ground station and a gateway.

In other words, the invention provides an extension of the exchange of telecommunication traffic in horizontal direction over the transmission connection 23 between the ground stations 15, 16, as well as in vertical direction via the transmission connections 20, 21 between ground stations 15, 16 and the gateways 18, 19 with international and global telecommunication traffic between clusters 10,11 of fixed 4, 5, 6 and land mobile 7, 8, 9 telecommunication networks.

Figure 4:
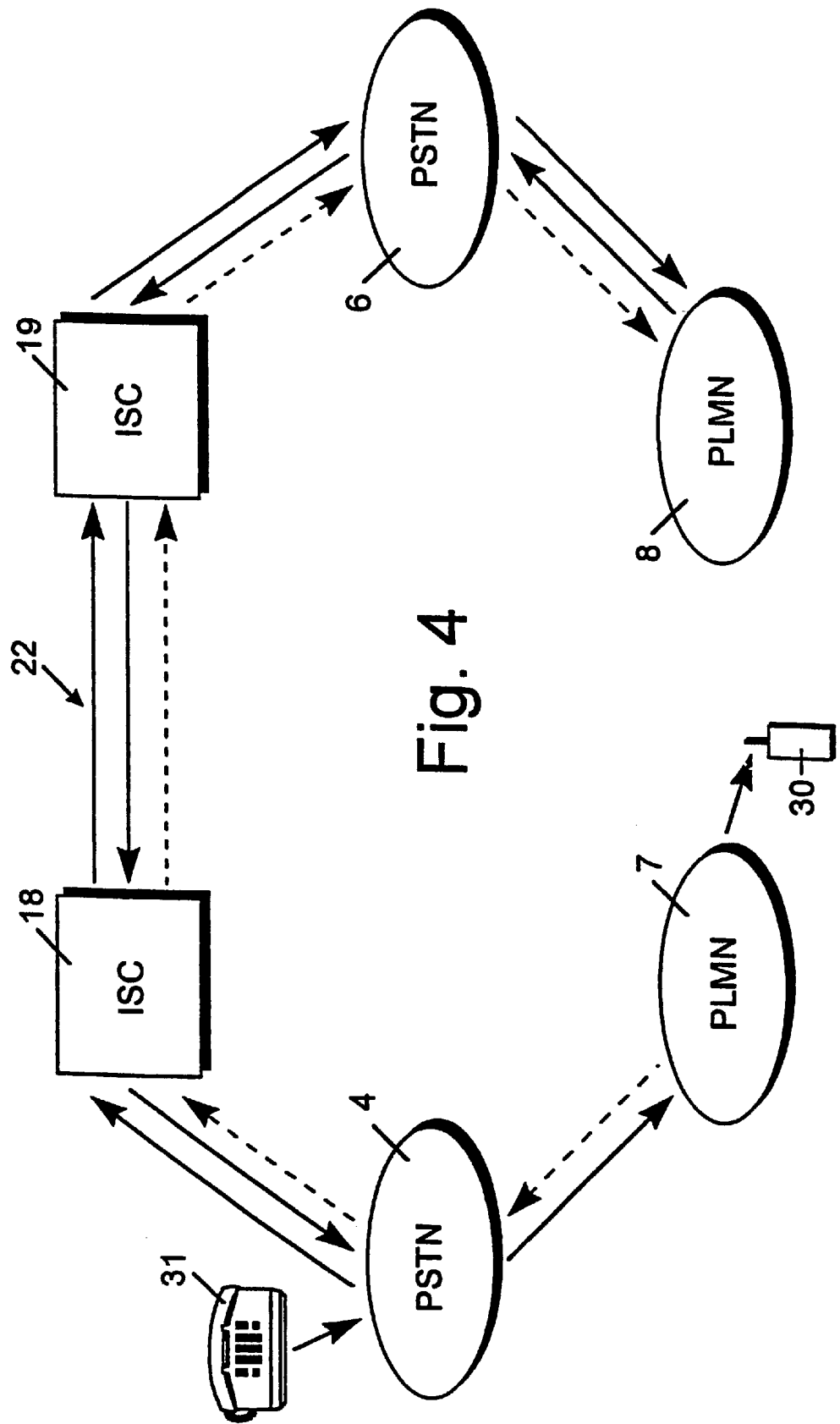
FIG. 4 shows in block diagram form the effect of tromboning between fixed and mobile telecommunication networks

FIG. 4 illustrates schematically the way in which according to the state of the art connection is made with a mobile user who makes guest use of a land mobile telecommunication network in e.g. another country.

Consider that the mobile user 30 has the PLMN 8 as home base, sometimes also designated as 'Home PLMN (HPLMN)', and that the user 30 makes guest use of the PLMN 7, in this context also designated as 'Visited PLMN (VPLMN)'.

When now the fixed user 31 desires a communication connection with the mobile user 30, the fixed user 31 will for this purpose give the address code of the country and the subscriber's number of the mobile user concerned. This leads to a connection being established via the gateways 18, 19, the transmission connection 22 to the home base of the mobile user 30 concerned, this is HPLMN 8. In the HPLMN 8 is observed that the user 30 is located abroad. From the HPLM 8 an international connection is now being established via the gateways 18 and 19 and an other transmission channel of the transmission connection 22 to the land mobile network concerned, where the mobile user 30 is momentary located, in this example the VPLMN 7.

From FIG. 4 is clearly visible that for establishing the eventual connection an additional international connection and additional connection means at national level are occupied, whereas the user 31 pays the normal rate as if the user 30 was located in his home network HPLMN 8. The costs for the second international connection (the routing connection) will be borne by the mobile user 30.

The situation becomes even more dramatic when the user 30 for instance makes use of a telecommunication service, like 'Call Forwarding on Busy', i.e. that an arriving call has to be switched through to a message service. Then from the VPLMN 7 a third international transmission path via the gateways 18, 19 and the transmission connection 22 to the HPLMN 8 has to be established, to deliver the message concerned in the HPLMN 8. In the figure this is shown with dashed arrows. In this case the costs are also borne by the mobile user 30.

With the addressing and number plan according to the invention this problem, also sometimes designated as 'tromboning', can be solved efficiently. Observe for this purpose FIG. 5.

In cellular land mobile telecommunication networks, such as e.g. based on the GSM standard, every mobile network possesses a so-called 'Visitor Location Register (VLR)', in which users are registered that make guest use of a network concerned and a so-called 'Home Location Register (HLR)', in which, among others, access data of subscribers of the mobile telecommunication network concerned are registered, as well as the momentary place of residence of a mobile user, i.e. the cell and/or the country.

Administrative data are registered in an 'Administration Register (AR)'.

Figure 5:
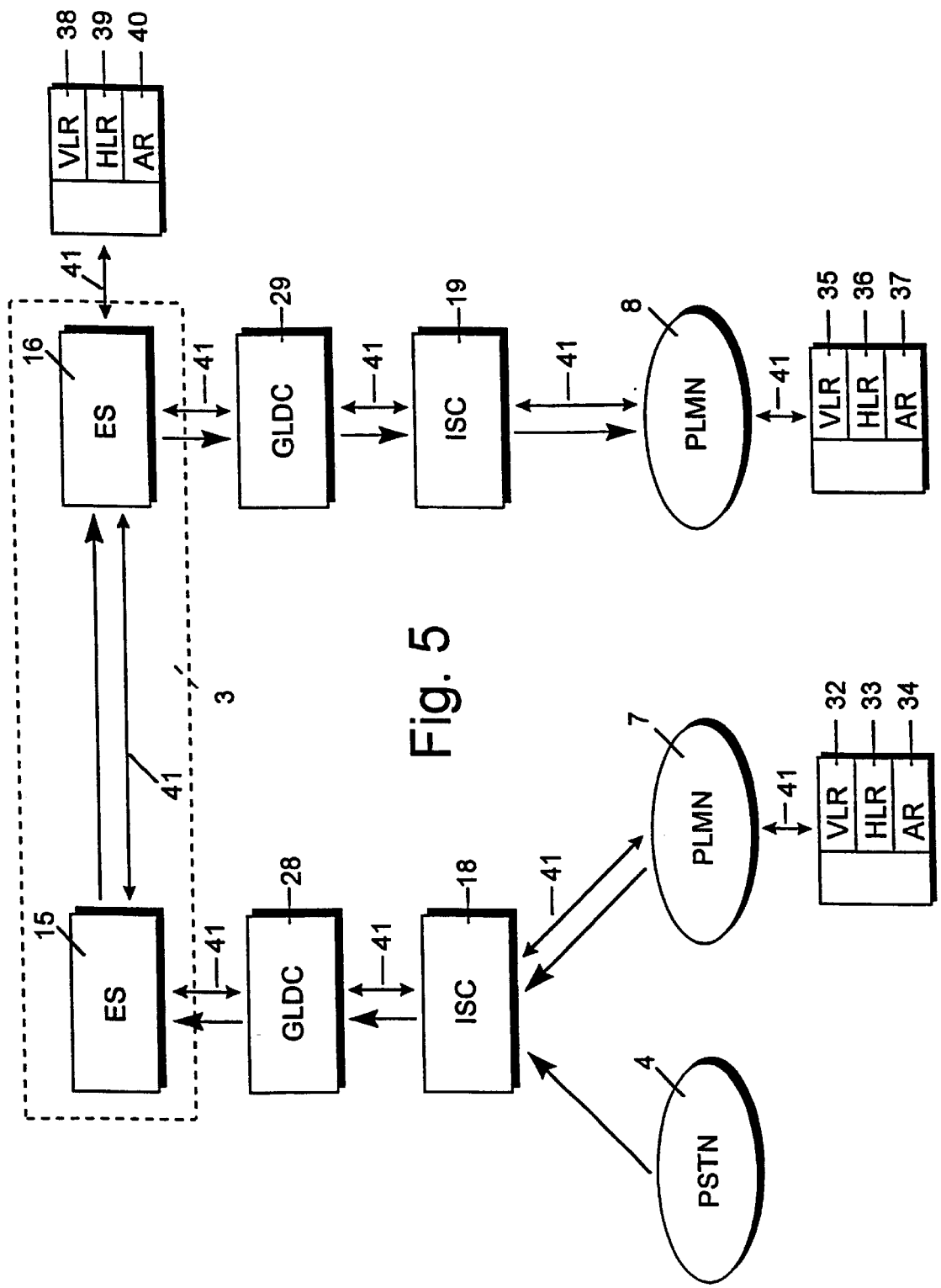
FIG. 5 shows, in sequence diagram form, the routing of telecommunication traffic based on the addressing plan according to the invention, without tromboning.

In FIG. 5 the VLR, HLR and AR concerned are shown for the PLMN 7 and the PLMN 8, indicated respectively by the reference numerals 32, 33, 34 and 35, 36, 37. In the case of a satellite communication network 3 that is also based on the GSM standard and in which direct telecommunication traffic between telecommunication satellites 12, 13 14 and mobile users 24 with suitable satellite communication equipment is possible (see FIG. 1), the satellite communication network 3 is also provided with a VLR 38, HLR 39 and AR 40, as schematically depicted in FIG. 5. The VLR 38 and the HLR 39 and admin [sic] 40 can, if desired, be common for the whole satellite communication network. Of course, a VLR and HLR can for instance be assigned to each ground station as well.

Via a signalling system, such as for instance the existing signalling system C7, information from various VLRs and HLRs can be requested.

By now, according to the addressing or number plan according to the invention, registering the actual location of a mobile user in the VLR or HLR concerned by means of the network address code of the PLMN concerned, the momentary place of residence of the mobile user can be located via the signalling connection. From the satellite communication system 3 a connection can then be made directly to the PLMN concerned where the user is located.

Consequentially, this means that with the addressing and number plan according to the invention an optimum routing of telecommunication traffic is possible, without unnecessary use of international connections.

In the example of FIG. 5, when the fixed user 31 from the PSTN 4 desires a connection with the mobile user 30, of which the PLMN 8 is the HPLMN and who is located in the PLMN 7 as the VPLMN, this user will in the first instance be addressed according to the invention with the address code '8812 12 xxxxxx'.

The address code '8812' leads therein to the satellite communication network 3. By means of the network address code '012' the signalling system 41 in the HLR 36 of the PLMN 8 can retrieve the momentary location of the mobile user 30. By advantageously registering this location according to the addressing plan according to the invention, i.e. with the network address code concerned, a connection can be established directly from the satellite communication network 3 with the mobile telecommunication network indicated by the network address code concerned.

In stead of directly retrieving the momentary location of the mobile user, via the signalling system, in the HPLMN of the user concerned, the momentary location of the mobile guest users can, if desired, also be registered in the VLR 38 of the satellite communication system 3 or in an other common VLR.

Although in the above only has been spoken about assigning a network code to land mobile networks, it will be appreciated by experts that also other telecommunication networks, connected to a ground station concerned, can be provided with a network address code for exchanging telecommunication traffic via the satellite communication network 3. Herewith can be thought of networks for special users, both fixed and mobile.

When in the above and in the attached claims thus is spoken about assigning network address codes to mobile telecommunication networks, within the scope of the invention also special (land) telecommunication networks should be comprehended. Moreover, it will be apparent for experts that in the transmission connection 23 suitable routing stations 42 can be included for fulfilling the routing function of a ground station, to which via a gateway 43 a cluster 44 of telecommunication networks is connected. Via these routing stations 42 use can again be made of all the advantages of the improved exchange of telecommunication traffic according to the invention. Both to a ground station 15, 16, and to these routing stations 42, which are included in the transmission connection 23, fixed and land mobile telecommunication networks can be connected directly, without intervention of a gateway.

The invention also comprises an addressing plan in which the ground stations 15, 16 and the routing stations 42 are provided with a unique follow address code, which is subordinate to the address code of the satellite communication network, and in which the network address code of the mobile and/or other special telecommunication networks is subordinate to such a follow address code.

What is claimed is:

1. Process for exchanging telecommunication traffic in a telecommunication system, comprising a satellite communication network, made up from a number of telecommunication satellites in different orbits around the earth, which are functionally connected to one or more ground stations via radio transmission connections, which ground stations are mutually connected via a transmission connection, as well as a ground communication network made up from a number of fixed and mobile telecommunication networks, in which clusters of fixed and mobile telecommunication networks are functionally connected to ground stations of the satellite communication network and telecommunication traffic is exchanged by application of an addressing plan, in which an own unique address code is assigned to the satellite communication network, wherein a unique network address code added to the address code of the satellite communication network concerned is assigned to the mobile telecommunication systems, which are functionally connected to a ground station, in such a way that telecommunication traffic with a mobile telecommunication network is exchanged via a combination of the address code of the satellite communication network and the network address code of the mobile telecommunication network concerned via the mutually connected ground stations.

2. Process according to claim 1, in which clusters of fixed and mobile communication networks via so-called transmission gateways are functionally connected to the ground stations of the satellite communication network, which transmission gateways are mutually connected via a transmission connection, wherein telecommunication traffic between clusters of fixed and mobile telecommunication networks is exchanged partly via the mutually connected ground stations and partly via mutually connected transmission gateways.

3. Process according to claim 2, wherein, for exchanging telecommunication traffic with a user, who makes guest use of a mobile telecommunication network, a communication connection is established under application of the network address code concerned of the mobile telecommunication network of which the user makes guest use.

4. Process according to claim 3, wherein the telecommunication satellites are set up for exchanging telecommunication traffic via radio transmission connections with users, who are provided with mobile satellite radio communication equipment, and mobile telecommunication traffic between mobile telecommunication networks and the satellite communication network is exchanged by establishing a communication connection under application of the network address code, which is assigned to a mobile telecommunication network concerned.

5. Process according to claim 3, wherein in the transmission connection with which the ground stations are connected, one or more routing stations are included to which mobile and/or clusters of fixed and mobile telecommunication networks are connected, in which telecommunication traffic is exchanged with a mobile telecommunication network which is connected to such a routing station, under application of its network address code via the routing system concerned.

6. Process according to claim 2, wherein the telecommunication satellites are set up for exchanging telecommunication traffic via radio transmission connections with users, who are provided with mobile satellite radio communication equipment, and mobile telecommunication traffic between mobile telecommunication networks and the satellite communication network is exchanged by establishing a communication connection under application of the network address code, which is assigned to a mobile telecommunication network concerned.

7. Process according to claim 2, wherein in the transmission connection with which the ground stations are connected, one or more routing stations are included to which mobile and/or clusters of fixed and mobile telecommunication networks are connected, in which telecommunication traffic is exchanged with a mobile telecommunication network which is connected to such a routing station, under application of its network address code via the routing system concerned.

8. Process according to claim 1 wherein for exchanging telecommunication traffic with a user, who makes guest use of a mobile telecommunication network, a communication connection is established under application of the network address code concerned of the mobile telecommunication network of which the user makes guest use.

9. Process according to claim 8, wherein the telecommunication satellites are set up for exchanging telecommunication traffic via radio transmission connections with users, who are provided with mobile satellite radio communication equipment, and mobile telecommunication traffic between mobile telecommunication networks and the satellite communication network is exchanged by establishing a communication connection under application of the network address code, which is assigned to a mobile telecommunication network concerned.

10. Process according to claim 8, wherein in the transmission connection with which the ground stations are connected, one or more routing stations are included to which mobile and/or clusters of fixed and mobile telecommunication networks are connected, in which telecommunication traffic is exchanged with a mobile telecommunication network which is connected to such a routing station, under application of its network address code via the routing system concerned.

11. Process according to claim 1, wherein the telecommunication satellites are set up for exchanging telecommunication traffic via radio transmission connections with users, who are provided with mobile satellite radio communication equipment, and mobile telecommunication traffic between mobile telecommunication networks and the satellite communication network is exchanged by establishing a communication connection under application of the network address code, which is assigned to a mobile telecommunication network concerned.

12. Process according to claim 11, wherein in the transmission connection with which the ground stations are connected, one or more routing stations are included to which mobile and/or clusters of fixed and mobile telecommunication networks are connected, in which telecommunication traffic is exchanged with a mobile telecommunication network which is connected to such a routing station, under application of its network address code via the routing system concerned.

13. Process according to claim 1, wherein in the transmission connection with which the ground stations are connected, one or more routing stations are included to which mobile and/or clusters of fixed and mobile telecommunication networks are connected, in which telecommunication traffic is exchanged with a mobile telecommunication network which is connected to such a routing station, under application of its network address code via the routing system concerned.

14. Telecommunication system, comprising a satellite communication network, made up from a number of telecommunication satellites in different orbits around the earth, which are functionally connected to one or more ground stations via radio transmission connections, which ground stations are mutually connected via a transmission connection, as well as a ground communication network made up from a number of fixed and mobile telecommunication networks, in which clusters of fixed and mobile telecommunication networks are functionally connected to ground stations of the satellite communication network and in which the ground stations are provided with routing means for exchanging telecommunication traffic according to an addressing plan comprising a unique address code for selecting the satellite communication network, wherein the routing means are provided with selection means for exchanging of telecommunication traffic with a mobile telecommunication network, under application of a unique network address code added to the address code of the satellite communication network for selecting a mobile telecommunication network concerned.

15. Telecommunication system according to claim 14, in which the clusters of fixed and mobile telecommunication networks are functionally connected via so-called transmission gateways, which transmission gateways are mutually connected via a transmission connection, wherein the transmission gateways are provided with routing means for exchanging telecommunication traffic between clusters of mobile and fixed communication networks partly via the mutually connected ground stations and partly via mutually connected transmission gateways.

16. Telecommunication system according to claim 15, wherein the satellite communication network and the ground communication network are connected to a signalling system and in which the mobile telecommunication networks are provided with means for registering the attainableness of a user in a mobile telecommunications network, wherein the signalling system is set up for, by means of the means for registering the attainableness of a user of a mobile telecommunication network, establishing the momentary mobile telecommunication network with which telecommunication traffic with a user concerned is to be exchanged, in order to establish a communication connection with the user via the network address code of the mobile telecommunication network concerned.

17. Telecommunication system according to claim 15, wherein the telecommunication satellites are set up for exchanging telecommunication traffic via radio transmission connections with users provided with mobile satellite radio communication equipment, and the selection means are set up for establishing a communication connection between the satellite communication network and a mobile telecommunication network under application of a network address code, which has been assigned to the mobile telecommunication network concerned.

18. Telecommunication system according to claim 15, wherein, in the transmission connection with which the ground stations are connected, one or more routing stations are included to which mobile and/or clusters of fixed and mobile telecommunication networks are connected, in which the routing stations are provided with routing means and selection means for exchanging telecommunication traffic with a mobile telecommunication network, which is connected to the routing station concerned, under application of the network address code of the mobile telecommunication network concerned.

19. Telecommunication system according to claim 14, wherein the satellite communication network and the ground communication network are connected to a signalling system and in which the mobile telecommunication networks are provided with means for registering the attainableness of a user in a mobile telecommunication network, wherein the signalling system is set up for, by means of the means for registering the attainableness of a user of a mobile telecommunication network, establishing the momentary mobile telecommunication network with which telecommunication traffic with a user concerned is to be exchanged, in order to establish a communication connection with the user via the network address code of the mobile telecommunication network concerned.

20. Telecommunication system according to claim 19, wherein the telecommunication satellites are set up for exchanging telecommunication traffic via radio transmission connections with users provided with mobile satellite radio communication equipment, and the selection means are set up for establishing a communication connection between the satellite communication network and a mobile telecommunication network under application of a network address code, which has been assigned to the mobile telecommunication network concerned.

21. Telecommunication system according to claim 19, wherein, in the transmission connection with which the ground stations are connected, one or more routing stations are included to which mobile and/or clusters of fixed and mobile telecommunication networks are connected, in which the routing stations are provided with routing means and selection means for exchanging telecommunication traffic with a mobile telecommunication network, which is connected to the routing station concerned, under application of the network address code of the mobile telecommunication network concerned.

22. Telecommunication system according to claim 14, wherein the telecommunication satellites are set up for exchanging telecommunication traffic via radio transmission connections with users provided with mobile satellite radio communication equipment, characterised in that the selection means are set up for establishing a communication connection between the satellite communication network and a mobile telecommunication network under application of a network address code, which has been assigned to the mobile telecommunication network concerned.

23. Telecommunication system according to claim 22, wherein, in the transmission connection with which the ground stations are connected, one or more routing stations are included to which mobile and/or clusters of fixed and mobile telecommunication networks are connected, in which the routing stations are provided with routing means and selection means for exchanging telecommunication traffic with a mobile telecommunication network, which is connected to the routing station concerned, under application of the network address code of the mobile telecommunication network concerned.

24. Telecommunication system according to claim 14, wherein in the transmission connection with which the ground stations are connected, one or more routing stations are included to which mobile and/or clusters of fixed and mobile telecommunication networks are connected, in which the routing stations are provided with routing means and selection means for exchanging telecommunication traffic with a mobile telecommunication network, which is connected to the routing station concerned, under application of the network address code of the mobile telecommunication network concerned.

* * * * *